(12) United States Patent
Svensson

(10) Patent No.: US 7,060,742 B2
(45) Date of Patent: Jun. 13, 2006

(54) PROTECTIVE COATING

(75) Inventor: Sigfrid Svensson, Brussels (BE)

(73) Assignee: Polysaccharide Industries AB, Bromma (SE)

( * ) Notice: Subject to any disclaimer, the term of this patent is extended or adjusted under 35 U.S.C. 154(b) by 0 days.

(21) Appl. No.: 10/472,949

(22) PCT Filed: Mar. 27, 2002

(86) PCT No.: PCT/SE02/00600

§ 371 (c)(1),
(2), (4) Date: Mar. 1, 2004

(87) PCT Pub. No.: WO02/079332

PCT Pub. Date: Oct. 10, 2002

(65) Prior Publication Data

US 2004/0129173 A1 Jul. 8, 2004

(30) Foreign Application Priority Data

Mar. 28, 2001 (SE) .................................... 0101096

(51) Int. Cl.
*C09D 179/02* (2006.01)
*C09D 101/12* (2006.01)
*C09D 101/28* (2006.01)
*C09D 105/00* (2006.01)

(52) U.S. Cl. ........................... 524/55; 524/41; 524/44; 524/45

(58) Field of Classification Search ............. 106/144.1, 106/162.2, 205.6, 217.6; 524/29, 31, 32
See application file for complete search history.

(56) References Cited

U.S. PATENT DOCUMENTS

| 3,909,469 | A | * | 9/1975 | Miller ........................ 524/44 |
| 5,017,237 | A | * | 5/1991 | Svensson ....................... 134/4 |
| 5,093,485 | A | | 3/1992 | Svensson |
| 5,116,747 | A | | 5/1992 | Moo-Young et al. |
| 5,397,520 | A | * | 3/1995 | Rohrbach et al. ............ 264/122 |
| 5,658,622 | A | * | 8/1997 | Berlin et al. ................ 428/34.2 |

FOREIGN PATENT DOCUMENTS

| EP | 0 400 484 | 5/1990 |
| EP | 0 897 964 | 2/1999 |
| JP | 58-186668 | 10/1984 |
| WO | WO 95/25604 | 9/1995 |
| WO | WO 95/25605 | 9/1995 |

* cited by examiner

*Primary Examiner*—David Brunsman
(74) *Attorney, Agent, or Firm*—Buchanan Ingersoll PC

(57) ABSTRACT

A composition is provided consisting of an aqueous solution comprising at least one natural polysaccharide or a derivative thereof and at least one polymeric polyamino compound, the composition being capable of forming a film when applied onto a substrate. The invention also involves a method for temporary protection of a substrate surface from environmental influence using such composition.

26 Claims, No Drawings

PROTECTIVE COATING

This application is a 371 of PCT/SE02/00600, filed 27 Mar. 2002.

FIELD OF THE INVENTION

The present invention relates to compositions in the form of aqueous solutions containing at least one natural polysaccharide or derivatives thereof and at least one polymeric polyamino compound. The invention also covers a method for temporary protection of a substrate surface from environmental influence using such compositions.

BACKGROUND OF THE INVENTION

Non-toxic and environmentally safe protective coatings are being developed in order to replace presently used systems, which are based on products which are, encountered with toxicological and environmental drawbacks, such as acrylics, urethanes and epoxy polymers manufactured from oil-based chemicals. Temporary water-based coatings based on polysaccharides have previously, been suggested for the protection of surfaces against unwanted contamination (cf. U.S. Pat. No. 5,017,237). Polysaccharides are generally non-toxic, biodegradable and non-allergenic. In order to be able to protect surfaces from aggressive chemicals, such as acids and bases neutralising, complex-forming or buffering systems can be incorporated into such protective coatings (cf. EP 751 837).

Recent developments have shown, that the stability of polysaccharides against weathering can be substantially improved by generating coating systems in which the coating product based on polysaccharides is transformed from liquid into gel in the process of drying into a protective film coating (cf. AU 682 594).

In order to develop the polysaccharide coating that can resist high concentrations of acid influence it was experienced that the high concentrations of buffering salts that were necessary to build high buffering capacity resulted in destruction of the film properties of the coating in regard to inter alia water resistance. The problem underlying the present invention was thus to find alternative neutralising/buffering systems having sufficient capacity to result in the formation of films of sufficient resistance to environmental influence.

SUMMARY OF THE INVENTION

Accordingly, the present invention has for a main object to provide coating compositions capable of forming resistant films on substrates to be protected.

Another object of the invention is to provide a protective coating system which is non-toxic and enviromentally acceptable.

Yet another object of the invention is to provide a coating composition capable of forming films which are resistant to water.

Still another object of the invention is to provide a sacrificial or reversible coating system for the protection of various substrates.

Another object of the invention is to provide a coating system for the protection of substrates selected from vehicles, such as cars, trains and air crafts, architectural structures, under-water structures obtaining anti-fouling properties, conifer seedlings for protection against insecticidal or microbial attack, and silver or copper articles for protection against oxidation or other types of discolouring.

DETAILED DESCRIPTION OF THE INVENTION

For these and other objects of the invention which will be clear from the following disclosure there is provided a composition consisting of an aqueous solution comprising at least one natural polysaccharide or a derivative thereof and at least one polymeric polyamino compound, said composition being capable of forming a film when applied on to a substrate.

Such film can be formed via at least partial gel formation, such as by evaporation of aqueous solvent.

As an alternative the composition may be capable of forming said film via gel formation by cooling from an elevated temperature and then evaporation.

In the composition according to the invention it is preferred that said polysaccharide has a $\beta$-1.4-glycan backbone.

The polysaccharide may also be selected from plant gums, bacterial and algae polysaccharides. Particularly preferred is the use in the composition of a plant gum as a polysaccharide.

Examples of such plant gum is locust bean gum, guar gum, and these two can be used in combination. In such combination it is preferred that locust bean gum constitutes a major constituent.

The polymeric polyamino compound contained in the composition according to the invention is preferably selected from proteins, polysaccharides and derivatives thereof containing amino functions, and aliphatic polymers containing amino functions.

Said polyamino compound may be constituted by a soluble cellulose or starch derivative containing amino functions.

As an alternative said polyamino compound may be constituted by chitosan or an aliphatic polymer containing amino functions.

It is particularly preferred that said polyamino compound is a polyethylenimine. The weight ratio between the polysaccharide and the polyamino compound is suitably within the range from about 5:1 to 1:5, such as from about 3:1 to 1:3.

In the composition according to the invention said polysaccharide together with said polyamino compound are present in the aqueous solution in an amount of not more than about 10% by weight.

It goes without saying that chitosan used as a polyeaccharide will not be combined with chitosan as a polyaminocompound, and vice versa.

To obtain optimal balance between on the one hand removability and on the other hand water-resistance of a film formed from the composition according to this invention, it is preferred to include an effective amount of a low molecular buffer, such as glycine or ethanol amine, in the composition. A preferred amount of such buffer is within the range about 10 to about 60% by weight, particularly about 20 to about 50% by weight, and especially about 25 to 40% by weight based on the weight of the composition.

Accordingly, such preferred composition consists of an aqueous solution comprising at least one natural polysaccharide or a derivative thereof, at least one polymeric polyamino compound, and an effective amount of a low molecular buffer, said composition being capable of forming a film when applied onto a substrate. Such preferred composition can include anyone of the features of the appended dependent composition claims.

The invention also provides for a method for temporary protection of a substrate surface from environmental influence. Such method resides in the application onto said surface of a composition as defined above, allowing evaporation of aqueous solvent from said composition as applied to form a protective film on said surface, whereby said film is removable by treatment with water. In the method according to the invention the film removal can be made using water of a temperature above room temperature and/or at an increased pressure.

The method according to the invention may be used for the temporary protection of the exterior of a vehicle during handling and transportation thereof.

Alternatively, the method according to the invention can be used for the protection of an under-water structure to protect from under-water growth.

As an alternative the method according to the invention may also be used for the protection of plant seedlings from microbial or insecticidal attack.

Another use of the method according to the invention is for the protection of silver ware or other metal objects from discolouring.

In the composition according to the invention there may additionally be contained a buffering system, such as maintaining a pH in the composition within the range of from about 5 to about 9.

Before entering into specific examples illustrating the invention more in detail it may be useful with a more general discussion around the two main components of the composition according to the invention, namely the polysaccharide on the one hand and the polymeric polyamino compound on the other hand. In the following disclosure reference is mainly made to polyethyleneimines as a polymeric polyamino compound, but it is to be noted that the invention is in no way restricted to such polymeric polyamino compounds.

The finding that polysaccharides and polyethylene imines together can form gels is to the best of our knowledge new and novel. Although the invention will not be limited to any particular theory or reaction mechanism the gel formation is probably due to a three-dimensional conformation of the polysaccharide to allow for hydrogen bonding. Electrostatic forces could also be involved.

Studies have demonstrated that locust bean gum, a β-1.4-D-mannan containing D-galactopyranose side chains α-linked to the 6-position to about 25% of the D-mannopyranose residues, in a concentration of 1.5% (w/v) can give a loose gel together with polyethylene imine (1.2%, w/v, in water).

In contrast to this guar gum, which has the same structure as locust bean gum except that it contains about the double amount of D-galactopyranose side chains, did not form a gel at the concentrations mentioned above. However, upon concentration of the mixture of guar gum and polyethylene imine a gel was formed before the formation of a solvent film.

These findings suggest that the gel formation is dependent on interactions between the β-1.4-mannan backbone and the polyethylene imine molecules and that too many side chains disturb this interaction.

Since the conformation of cellulose (β-1.4-glucan) and a β-1.4-mannan is similar in that both have a ribbon conformation structure, it was surprising to find that water soluble derivatives of cellulose also could interact to form gels with polyethylene imine.

Several other polysaccharides with ribbon conformation, such as hemi-cellulosic galactoglucomannans consisting of a backbone of β-D-1.4-linked mannopyranosyl and glucopyranosyl residues which can be substituted at the 6-position with single α-D-galactopyranosyl residue and amyloids which are xyloglucans with a main chain consisting of β-D-1.4-linked glucopyranosyl residues which can be substituted with 2-O-β-D-galactopyranosyl-D-xylopyranosyl units α-linked to the 6-position of the glucopyranosyl units.

Similar ribbon conformations are also expected for esparto xylan, arabinoxylans and 4-O-methylglucoronoxylans which all have a β-1.4-D-xylopyranosyl backbone.

The parent polysaccharides cellulose, mannan or xylan are essentially insoluble in water but the introduction of mono- or disaccharide side chains or substituents will increase their solubility in water, other substituents may have a similar effect. Thus β-D-1.4-linked glucomannan (ivory nut mannan) is insoluble in water whereas Konjac mannan which contains about one acetyl group per ten glycosyl residues is moderately soluble in water.

As an example, cellulose can be made soluble in water by adding substituents, such as hydroxyethyl, methylcarboxymethyl or acetyl groups.

Other polysaccharides are also capable of forming gels with polyethylenimine provided they have a suitable conformation in solution or can interact electrostatically or by hydrogen bonding. Thus, it has been found that pectins containing carboxyl groups and polysaccharides containing sulphate groups could form gels with polyethylenimines and other polymeric polyamino compounds, probably due to electrostatic interactions.

The present invention is based on the ability of polysaccharides to form at least partially a gel structure with a polymeric polyamino compound, such as polyethylenimine, on evaporation of a mixture in a suitable aqueous solvent. The jellied mixture is then allowed to dry into a solid film. If such evaporation of solvent takes place at an elevated temperature the resulting film will be strengthened and the film more resistant to exposure to water.

Other polyamino compounds, such as chitosan, polylysine and polymers modified by introduction of amino groups, e.g. diethylaminoethyl cellulose, diethylaminoethyl starch and diethylaminoethyl dextran, are also capable of forming gels with an appropriate β-1.4-glycan.

The present invention will in the following be further illustrated more in detail by non-limiting examples. In these examples figures and percentages relate to weight unless otherwise stated.

EXAMPLE 1

To an aqueous solution containing 0.375% (w/v) of locust bean gum and 1.125% (w/v) of guar gum was added Lupasol SK, MW 2000 000 (BASF), to give a final concentration of 1.8% (w/v). The mixture was thoroughly mixed and the pH adjusted to 8. The resulting viscous solution was applied to lacquered test plates (0.5 L/m$^2$).

Three methods of drying were used:
1. Forced drying in an oven at 70° C. for 20 min.
2. Forced drying using infrared heater for 10 min.
3. Drying in room temperature for 20 hrs.

The coating dried at elevated temperatures (1 and 2) and became very tough and were scratch resistant.

Showering the coatings with water at room temperature for 1 hour resulted in some swelling of the coatings (most apparent on the coating dried by method 3, but the coatings were essentially resistant to this water exposure at room temperature.

The coatings were tested according to test recommendations from Volvo AB including test with 1% aqueous sulphuric acid and 50% aqueous slurry of pancreatinine in water at temperatures up to 80° C.

After removal of the coatings (high-pressure water at 100 bars and 80° C.) no destructive effect was observed on the coated areas of the lacquered test plate. Some fogging (absorption of water) could occasionally be observed at the places where the test solutions had been added. A short heating procedure could easily remove these fogged spots.

EXAMPLE 2

The galactomannans guar gum and locust bean gum in the proportions 75:25 (w/w) were dissolved in water (2.2% at 90° C. and allowed to cool to 40° C. To the resulting solution was added polyethylenimine, Lupasol P, MW 750 000 (BASF) in a concentration of 3.6% (w/v). After careful mixing, the pH was adjusted to 8.0 by the addition of acetic acid. The resulting solution was sprayed on a lacquered metal surface (0.3 l/m$^2$) and allowed to dry. During the drying process the solution changed into gel before forming a film. Using the experimental procedure as in Example 1 similar results were obtained.

EXAMPLE 3

To an aqueous solution of 1.5% (w/v) of locust bean gum was added Lupasol P to a final concentration of 1.2% (w/v) and the mixture was thoroughly mixed. The pH of the solution was adjusted to 12. The resulting solution was applied to solution to lacquered test plates (0.25 L/m$^2$) and immersed into coastal waters at the East and West Coast of Sweden. After 3 months the test plates were inspected for barnacle and algae growth and it was found that the growth of these organisms was significantly reduced. The dirt that had accumulated and the coating could easily be removed by high-pressure water.

EXAMPLE 4

To an aqueous solution of 1.5% (w/v) of locust bean gum was added Lupasol P to a final concentration of 1.2% (w/v) and the mixture was thoroughly mixed. The pH of the solution was adjusted to 13. The resulting solution was sprayed on the stems of coniferous plant seedlings (1.5 years old) 15 cm from the roots and upwards. In an arena test consisting of 10 treated and 10 non-treated plant seedlings were introduced 20 pine weevils (*Hylobious abietis*). After one week the seedlings were inspected for damages caused by the pine weevil. It was found that the pine weevil had killed 9 of the unprotected plant seedlings whereas only minor damages had been inflicted upon the plants seedlings that had been sprayed by the solution containing locust bean gum/Lupasol P.

EXAMPLE 5

To an aqueous solution of locust bean gum (1% w/v) was added Lupasol P to a final concentration of 1.2% (w/v), pH was adjusted to 8 and the mixture was thoroughly mixed. The resulting-solution was applied onto a silver chandelier and after 6 months it was still unaffected whereas a non-protected identical chandelier had become brownish-black.

EXAMPLE 6

To an aqueous solution of locust bean gum (2%, w/v) was added Lupasol P (1.2%, w/v) neutralised by acetic acid and glycine (1.5%, w/v) and the resulting solution was thoroughly mixed. The solution was then sprayed (0.3 litres per metre square), using an airless sprayer at 150 bars of pressure, on to a test plate lacquered with a car laquer. The sprayed test plate was then dried at 70° C. for 30 minutes in an oven. The coated test plate was then shown to be stable to rain as simulated by showering the test plate with room temperature water for one hour. To the coated test plate was then added one drop of aqueous sulphuric acid (1%, w/v) and at another area one drop of M aqueous sodium hydroxide and the test plate was then placed in an oven at 80° C. for 30 minutes. The test plate was allowed to cool to room temperature and the coating was removed with water (90° C.) at 150 bars of pressure. On inspection no damage was found on the lacquer surface.

In another test the coated test plate was heated at 80° C. for 6 days in an oven and after cooling the coating was removed by water (90° C.) at 150 bars of pressure. On inspection of the lacquered surface no damage was observed.

EXAMPLE 7

To an aqueous solution of locust bean gum and guar gum (1:3, 2%, w/v) was added Lupasol P neutralised by acetic acid (1.2, w/v) and glycine (1.5%, w/v) and the resulting mixture was carefully mixed. This solution was used to coat test panels as described in Example 1. Test of the coated panels gave essentially the same result as given in Example 1.

EXAMPLE 8

To an aqueous solution of locust bean gum (2%, w/v) was added Lupasol P, neutralised by acetic acid (1.2%, w/v) and ethanol amine neutralised by acetic acid (1.5%, w/v) and the resulting mixture was carefully mixed. The solution was used to coat test panels as described in Example 1 and the coated panels was tested as described in Example 1. The tests gave similar results as described in Example 1.

The invention claimed is:

1. A composition consisting of an aqueous solution comprising at least one polysaccharide having a β-1,4-glycan backbone selected from the group consisting of locust bean gum, guar gum, esparto xylan, arabinoxylan, Kojac mannan, hydroxyethyl cellulose, methylcarboxymethyl cellulose, and acetyl cellulose, or a derivative thereof and polyethylene imine, said composition being capable of forming a film, via at least partial gel formation, when applied onto a substrate.

2. A composition according to claim 1, capable of forming said film by evaporation of aqueous solvent.

3. A composition according to claim 1, capable of forming said film via gel formation by cooling from an elevated temperature and then evaporation.

4. A composition according to claim 1, wherein said polysaccharide having a β-1,4-glycan backbone is locust bean gum, guar gum or both in combination.

5. A composition according to claim 4, wherein said combination contains locust bean gum as a major constituent.

6. A composition according to claim 1, wherein the weight ratio between said polysaccharide and said polyethylene imine is within the range about 5:1 to 1:5.

7. A composition according to claim 6, wherein said range is from about 3:1 to 1:3.

8. A composition according to claim 1, wherein said polysaccharide together with said polyethylene imine are present in the aqueous solution in an amount of not more than about 10% by weight.

9. A composition according to claim 1 further containing a buffering system.

10. A method for temporary protection of a substrate surface from environmental influence, comprising application onto said surface a composition according to claim 1, allowing evaporation of aqueous solvent from said composition as applied to form a protective film via at least partial gel formation on said surface, said film being removable by treatment with water.

11. A method according to claim 10, wherein said film is removable by water having a temperature above room temperature.

12. A method according to claim 11, wherein said film is removable by pressure washing with a stream of water.

13. A method according to claim 11 for the temporary protection of the exterior of a vehicle during handling and transportation.

14. A method according to claim 11 for the protection of an under-water structure to protect from under-water growth.

15. A method according to claim 11 for the protection of plant seedlings from microbial or insecticidal attack.

16. A method according to claim 11 for the protection of silverware from discoloration.

17. A method according to claim 10, wherein said film is removable by pressure washing with a stream of water.

18. A method according to claim 17 for the temporary protection of the exterior of a vehicle during handling and transportation.

19. A method according to claim 17 for the protection of an under-water structure to protect from under-water growth.

20. A method according to claim 17 for the protection of plant seedlings from microbial or insecticidal attack.

21. A method according to claim 17 for the protection of silverware from discoloration.

22. A method according to claim 10 for the temporary protection of the exterior of a vehicle during handling and transportation.

23. A composition according to claim 22, wherein the pH is within the range of from about 5 to about 9.

24. A method according to claim 10 for the protection of an under-water structure to protect from under-water growth.

25. A method according to claim 10 for the protection of plant seedlings from microbial or insecticidal attack.

26. A method according to claim 10 for the protection of silverware from discoloration.

* * * * *